US008361542B2

(12) United States Patent
Miller et al.

(10) Patent No.: US 8,361,542 B2
(45) Date of Patent: Jan. 29, 2013

(54) APPARATUS AND METHODS FOR TREATING MULCH IN SITU

(76) Inventors: Alan T. Miller, Zimmerman, MN (US); Terrance P. Fenelon, Mendota Heights, MN (US)

(*) Notice: Subject to any disclaimer, the term of this patent is extended or adjusted under 35 U.S.C. 154(b) by 484 days.

(21) Appl. No.: 12/613,090

(22) Filed: Nov. 5, 2009

(65) Prior Publication Data

US 2010/0108774 A1    May 6, 2010

Related U.S. Application Data

(60) Provisional application No. 61/111,511, filed on Nov. 5, 2008, provisional application No. 61/144,555, filed on Jan. 14, 2009.

(51) Int. Cl.
*A01G 5/06* (2006.01)
*A01G 7/00* (2006.01)
*A01N 1/00* (2006.01)
*B05C 1/16* (2006.01)
*B05D 5/10* (2006.01)
*A01M 21/04* (2006.01)
*A01C 23/00* (2006.01)

(52) U.S. Cl. .............. 427/136; 427/4; 427/137; 47/1.5; 47/9; 111/118; 111/129

(58) Field of Classification Search .................. 47/1.5, 47/9; 111/118, 129, 901; 239/1, 8, 9, 270, 239/289; 427/4, 136; 504/101, 102, 113, 504/116.1; 134/26, 27, 34, 38, 42
See application file for complete search history.

(56) References Cited

U.S. PATENT DOCUMENTS

| | | | |
|---|---|---|---|
| 4,932,156 A * | 6/1990 | Underwood | 47/9 |
| 5,914,153 A * | 6/1999 | Swink et al. | 427/242 |
| 6,283,385 B1 * | 9/2001 | Beaver et al. | 239/10 |
| 6,301,829 B1 * | 10/2001 | Kaufmann | 47/9 |
| 6,517,232 B1 | 2/2003 | Blue | |
| 6,536,939 B1 | 3/2003 | Blue | |
| 6,551,401 B1 | 4/2003 | Winistorfer et al. | |
| 6,551,655 B2 * | 4/2003 | White et al. | 427/212 |
| 7,441,941 B2 | 10/2008 | Vernon | |
| 2004/0213926 A1 * | 10/2004 | Cheirrett et al. | 428/15 |
| 2005/0230073 A1 | 10/2005 | Hesse et al. | |
| 2007/0174980 A1 * | 8/2007 | Prevost | 15/50.1 |
| 2008/0057184 A1 * | 3/2008 | Stein | 427/136 |

OTHER PUBLICATIONS

Internet website www.mulchrenew.com home page dated May 7, 2008.

* cited by examiner

*Primary Examiner* — Michael Cleveland
*Assistant Examiner* — Michael Wieczorek
(74) *Attorney, Agent, or Firm* — Kagan Binder, PLLC

(57) ABSTRACT

Methods for applying a treatment, such as colorant, to an installed landscaping material (such as wood chips or mulch), reducing the need to replace worn or weathered material. The methods include applying a pre-treatment to protect elements proximate the landscape material that are not to be treated, applying a treatment liquid to the landscaping material by spraying, and then rinsing any elements proximate the landscape material that may have be inadvertently and undesirably treated. Also described is a sprayer apparatus for applying treatment liquid to a landscaping material. The sprayer apparatus includes first and second spray outlets and an agitator therebetween. In use, the landscape material to be treated is first sprayed, the material is agitated (e.g., turned), and a second spray of treatment liquid is applied to the landscape material.

11 Claims, 4 Drawing Sheets

APPARATUS AND METHODS FOR TREATING MULCH IN SITU

CROSS REFERENCE TO RELATED APPLICATIONS

This application claims the benefit of U.S. Provisional application No. 61/111,511 filed Nov. 5, 2008 entitled "Apparatus and Methods for Treating Mulch in situ" and of U.S. Provisional application No. 61/144,555 filed Jan. 14, 2009 entitled "Apparatus and Methods for Treating Mulch in situ", the entire disclosures of which are incorporated herein.

FIELD OF THE INVENTION

This invention generally relates to methods and an apparatus for coating or treating wood fiber such as mulch or wood chips.

BACKGROUND OF THE INVENTION

Landscaping materials, such as wood chips and wood mulch, are currently available in their natural colors, and in some cases, are available colored in various colors, for example, in black, brown, red, orange and various shades thereof. The materials are generally colored at a large facility, which may be the facility that manufactures the materials or a facility that post-treats the material. The coloring can be done in batch form, by adding pigment and the material to large vats or mixers; alternately, the coloring can be done in a continuous manner, using a conveyor belt or auger system. The colored material is packaged and shipped to the eventual consumer.

Colored wood chips and wood mulch are applied to the desired area in a layer usually about 2 to 6 inches thick. Upon exposure to the elements (e.g., sunlight, rain, snow, etc.) and over time the color fades. The common solution to refreshen the area is to merely replace the weathered material with new material, or to add new material to cover up the old.

Although the cost of all landscaping materials is increasing, the cost of wood chips and mulch is increasing at a greater pace, due to the downturn in the construction industry. Wood chips and mulch for landscaping are typically the by-product from wood processing. As the amount of lumber produced decreases, so does the availability of wood by-product, either from the mills or the areas where it is harvested.

In an attempt to reduce the amount of new wood chips and mulch needed to refreshen landscaping, some have attempted to reapply color to the installed wood material. This in situ refreshing has been done, for example, by spraying the installed material with a liquid pigment from a hand-held sprayer. Although this process is superficially acceptable, in that it colors the exposed material, improvements can be made.

BRIEF SUMMARY OF THE INVENTION

This disclosure describes various methods for applying a treatment, such as colorant, to an installed landscaping material (such as wood chips or mulch), reducing the need to replace worn or weathered material and thus reducing the amount of new material needed. The method of applying the treatment includes applying a pre-treatment to protect elements proximate the landscape material that are not to be treated, applying a treatment liquid to the landscape material by spraying, and then rinsing any elements proximate the landscape material that may have be inadvertently and undesirably treated. Also described is a sprayer apparatus that is particularly well adapted for applying treatment liquid to a landscaping material. The sprayer apparatus includes first and second spray outlets and an agitator therebetween. In use, the landscape material to be treated is first sprayed, the material is agitated (e.g., turned), and a second spray of treatment liquid is applied to the landscape material.

The spraying apparatus applies the treatment to the landscape material in such a manner that infusion or penetration of the treatment is obtained into the landscape material, rather than merely a surface coating. Additionally or alternately, the spraying apparatus applies the treatment on multiple surfaces or sides of the landscape material. When used in combination, the spraying apparatus with the methods of this invention provide a refreshed and new look to landscaping material with minimal expense and use of natural resources (e.g., new mulch or wood chips).

A first particular embodiment of this invention is an apparatus having an elongate wand having a proximal end and a distal end, the distal end having an agitation system and an application system. The agitation system includes an agitator mechanism extending laterally between a first wheel and a second wheel mounted on an axel, each wheel having a circumference, with the agitator mechanism extending past the wheels' circumference. The application system includes a first nozzle and a second nozzle, the first nozzle positioned on a leading side of the agitator mechanism and the second nozzle positioned on a trailing side of the agitator mechanism. The proximal end of the wand has a connector for connecting to a liquid source. A fluid connection exists between the connector and the first nozzle and the second nozzle. In some embodiments, the application system is spaced from the agitation system and is positioned closer to the proximal end than is the agitation system. Also in some embodiments, the first nozzle is on a leading side of the axel and the second nozzle is on a trailing side of the axel. The agitator mechanism can be positioned even with the axel, on the trailing side of the axel, or on the leading side of the axel.

A second particular embodiment of this invention is a method for applying treatment to landscaping material in situ. The method includes pre-treating areas not to be treated proximate the landscaping material, applying a treatment material onto and/or into the landscaping material, and rinsing the pre-treated areas after the treatment material is applied. The treatment material may be applied before the pre-treatment dries. Similarly, the rinsing may be done before the treatment material dries.

A third particular embodiment of this invention is a method for applying treatment to and/or into landscaping material in situ. The method includes spraying a treatment material onto the landscaping material, agitating the sprayed landscaping material, and spraying the treatment material onto the agitated landscaping material.

BRIEF DESCRIPTION OF THE DRAWING

The invention may be more completely understood in consideration of the following detailed description of various embodiments of the invention in connection with the accompanying drawing, in which.

DETAILED DESCRIPTION OF THE INVENTION

The present disclosure provides an apparatus and methods for applying a treatment (e.g., color) to landscape material while the material is installed in a landscape application; the methods treat the landscape material in situ. It is to be understood that the apparatus and methods are not limited to being in conjunction, but rather, the apparatus may be used in other methods of applying a treatment to material and the methods may be done with an applicator other than the apparatus of this disclosure.

The methods and apparatus of this disclosure provide numerous advantages over previous methods that treat landscape material prior to installation of the material. First, because these methods and apparatus of this disclosure treat the landscape material in situ, only the exact amount of material needed for the application is treated, eliminating any extraneous and wasted material. Treating old, already installed landscape material, rather than removing old material and replacing it with new material, saves time, money, and resources (e.g., trees). No equipment is needed to remove the old material and dispose of the material, thus saving time, fuel, and reducing exhaust emissions to the atmosphere. Further, less equipment is needed to haul and spread new material, thus decreasing the needed time, fuel, and exhaust emissions to the atmosphere. Treating old material in situ provides a monetary savings of up to at least 50%, as compared to replacing the material. These and other advantages are benefits of the methods and apparatus of this disclosure.

In the following description, reference is made to the accompanying drawing that forms a part hereof and in which are shown by way of illustration at least one specific embodiment. The following description provides additional specific embodiments. It is to be understood that other embodiments are contemplated and may be made without departing from the scope or spirit of the present invention. The following detailed description, therefore, is not to be taken in a limiting sense.

Figure 1:
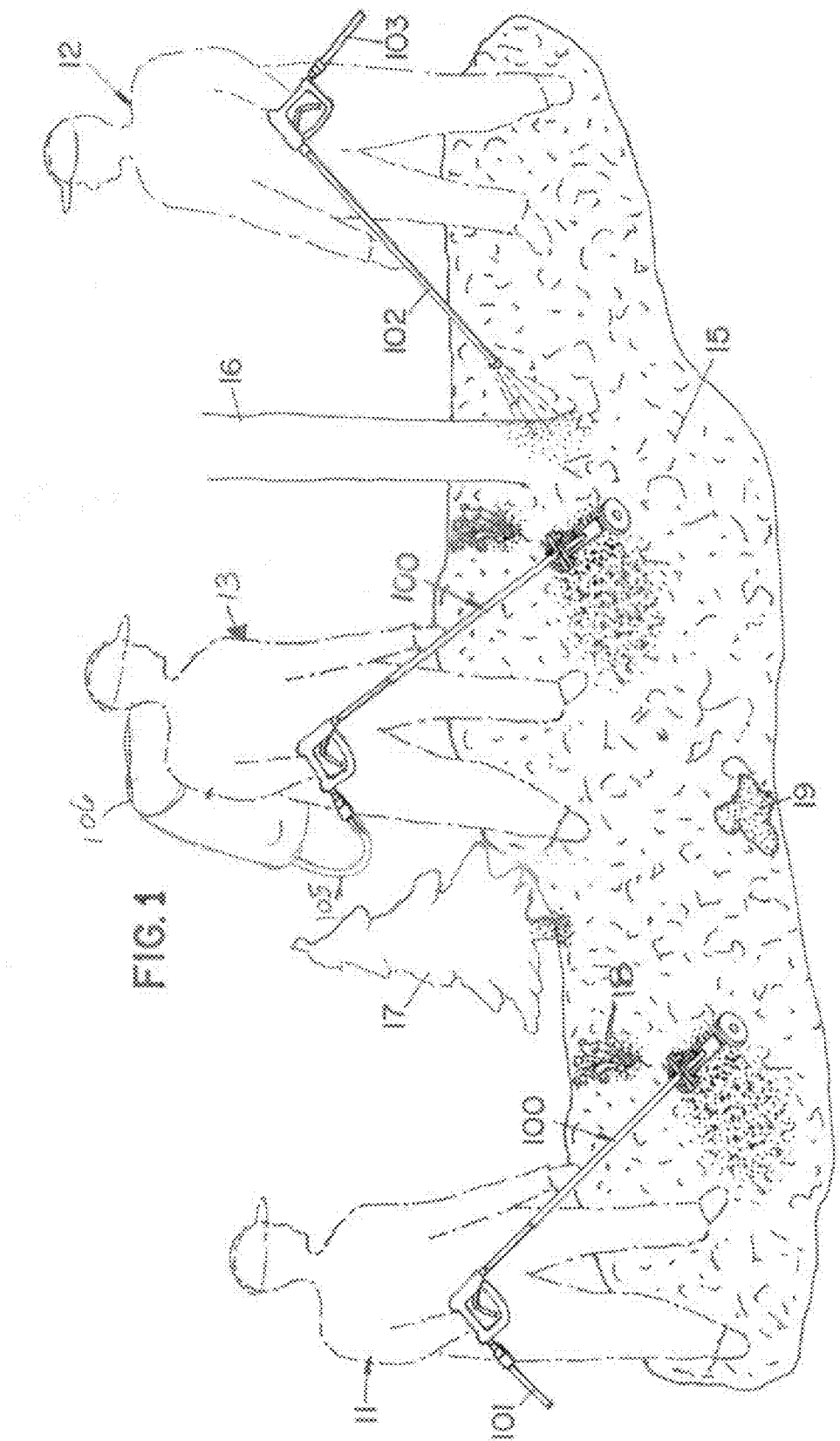
FIG. 1 is a side view of personnel practicing a method of treating landscape material according to this disclosure.

FIG. 1 illustrates a typical environment for practicing the methods of this invention. This environment may be a residential yard, a commercial area such as landscaping around a store, mall, or government building, or a public setting such as a park. In this scene, three personnel 11, 12, 13 are treating landscape material 15 in situ in accordance to the methods of this invention.

Landscape material 15 is present over an area of the ground to provide an aesthetic, neatly kept look. Landscape material 15 is a material commonly used as a protective cover placed over the soil and is used to control weed growth, retain moisture in the soil, add nutrients to the soil, repel insects, and/or as erosion or sediment control. The material is commonly a particulate or fibrous cellulosic product, such as wood chips or wood mulch. Examples of different types of wood materials include cedar mulch, pine bark chips, pine nuggets, and recycled woods from pallets and construction refuse. Other examples of landscape material 15 that could be treated by methods of this invention include cocoa beans, straw, shredded rubber, and other particulate or fibrous ground covering materials.

When installed, landscape material 15 is dispersed among various decorative or functional elements. In this scene, landscape material 15 surrounds and is positioned under flora such as deciduous trees 16, evergreen trees 17, and bush 18, and also surrounds other elements such as rock 19. An edging may be used to retain landscape material 15 in the desired area. In some environments, the area of landscape material 15 is defined by concrete curbs or walks.

In FIG. 1, both person 11 and person 13 are illustrated treating landscape material 15 using an applicator 100, described in detail below. In some embodiments, only one person may be treating the landscaping material. It is to be understood that alternate applicators could be used to treat landscaping material 15. Applicator 100 applies a liquid treatment material, such as pigment or colorant, to landscape material 15; applicator 100 applies the treatment material at least onto the surface of landscape material 15 and optionally the treatment material infuses into landscape material 15. Applicator 100 applies the treatment material onto or into at least one surface of landscape material 15. For person 11, the liquid treatment is provided to applicator 100 via hose 101; for person 13, the liquid treatment is provided to applicator 100 via hose 105 connected to tank 106. Person 12 is illustrated either pre-treating or post-treating the non-intended elements (i.e., those elements other than landscaping material 15) using a sprayer 102, which is fed via hose 103. Both pre-treatment and post-treatment includes the application of liquid (in most embodiments, water) to the surfaces of the elements not intended to be treated. For example, the truck of tree 16 can be pre-treated to inhibit the treatment liquid from adhering to tree 16, and can be post-treated to remove any treatment liquid that might have been applied or oversprayed onto tree 16. Other elements such as branches of evergreen 17 and bush 18 are also pre-treated and post-treated. Adjacent construction or hardscapes such as sidewalks, curbs and buildings may be pre-treated and additionally physically masked to inhibit overspray from the treatment application. Highly porous elements such as concrete or rocks may be pre-treated for a longer duration or at a higher flow rate or pressure than flora such as bush 18.

In accordance with the methods of this invention, landscape material 15 is treated, refreshed, refurbished, etc., using an applicator, such as applicator 100, to apply the treatment liquid onto and/or infused into landscape material 15. The elements proximate landscape material 15, elements such as trees 16, 17, bush 18 and rock 19 are pre-treated and post-treated using sprayer 102, which applies a liquid (e.g., water) supplied by hose 103.

In operation, person 12 pre-treats elements such as the trunk of tree 16, the lower branches of evergreen tree 17, bush 18, and rock 19 via sprayer 102 prior to person 11 and/or person 13 following with applicator 100. Any elements proximate landscape material 15 that might be erroneously or inadvertently sprayed or contacted with the treatment liquid should be pre-treated. The pre-treatment step may occur a few seconds to a few minutes prior to the treatment step. The pre-treated elements should be at least moist, and preferably wet, prior to application of the treatment liquid in adjacent areas of landscape material 15. After the pre-treatment, landscape material 15 is treated (e.g., colored) by application of the treatment liquid thereto. After treatment, the elements such as the trunk of tree 16, the lower branches of evergreen tree 17, bush 18, and rock 19 are post-treated (e.g., rinsed) by person 12 via sprayer 102. The post-treatment or rinse step may occur a few seconds to a few minutes after the treatment step. The treatment liquid should not be allowed to completely dry on the elements, as it will hinder the removal of the treatment liquid from the elements by the post-treatment step.

In the illustrated method, applicator 100 used by person 11 is connected via hose 101 to a remote treatment liquid source (not illustrated), sprayer 102 is connected via hose 103 to a rinse liquid source (not illustrated), and applicator 100 used by person 13 is connected via hose 105 to treatment liquid in back-pack tank 106. The treatment liquid source and the rinse liquid source may be separate sources (e.g., tanks, faucets, etc.) or may be the same source (e.g., tank, faucet, etc.) to which is added any additive (e.g., pigment for the treatment step), or may be separate sources.

The treatment liquid applied to landscaping material 15 may include, for example, colorant (pigment, dye, stain), fire retardant, fungicide, algaecide or other microbial growth inhibitor, UV inhibitor, scent/odor, or antioxidant. Although the discussion herein uses the term "treatment liquid", there may be embodiments where the treatment material is gaseous or solid (e.g., particulate).

The specific treatment liquid composition will vary depending on the particular application process (e.g., pressure, applicator design, etc.). It has been found, however, that the level of binder in the treatment liquid needed for treating mulch in situ is greater than the level of binder needed for coloring mulch prior to application of the mulch (for example, in batch processes). The higher level of binder provides for faster drying or setting of the treatment onto the mulch. The binder level for in situ treatment is at least about 100% more, sometimes at least about 200% more, and sometimes at least about 300% more than for prior processing. In another way, the binder level for in situ treatment is at least about 2× more, sometimes at least about 3× more, and sometimes at least about 4× more. In some embodiments, the treatment liquid is an aqueous colorant that includes about 9-10 wt-% binder and about 50-70 wt-% pigment. In one particular example, a treatment liquid has about 9-9.5 wt-% binder and about 60 wt-% colorant. In another particular example, a treatment liquid has about 9-9.5 wt-% binder and about 67 wt-% colorant. Preferred treatment liquids, including any colorant present therein, is non-toxic and 100% safe for the environment, people and pets.

The overall methods of treating particulate landscaping material according to this invention include pre-treating, applying treatment liquid, and then rinsing. Other embodiments other than described above are within the scope of this invention. For example, either or both applicator 100 and sprayer 102 may be confined units, not connected to a source via hose 101, 103, respectively, but may have their liquid source located proximate applicator 100 or sprayer 102. In FIG. 1, person 13 is utilizing applicator 100 connected to back-pack type unit 106. Any number of personnel may be used for treatment, pre-treatment and/or post-treatment; for example, one person may be a dedicated pre-treater and a second person may be a dedicated post-treater. Additive(s) may be added to either the pre-treatment liquid or the post-treatment rinse. For example, the pre-treatment liquid may include an additive to facilitate the removal of any treatment liquid. The post-treatment rinse may include fertilizer or other additive.

Figure 2:
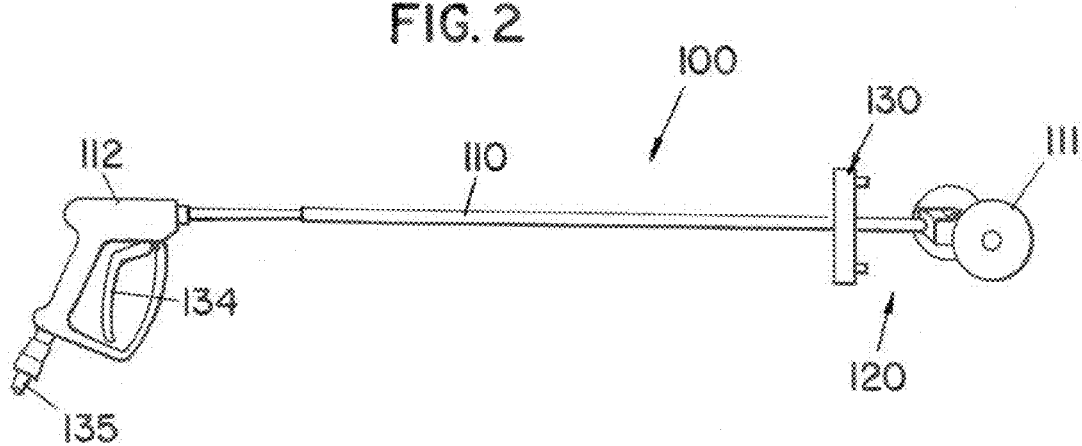
FIG. 2 is a perspective side view of an apparatus according to this disclosure.
Figure 3:
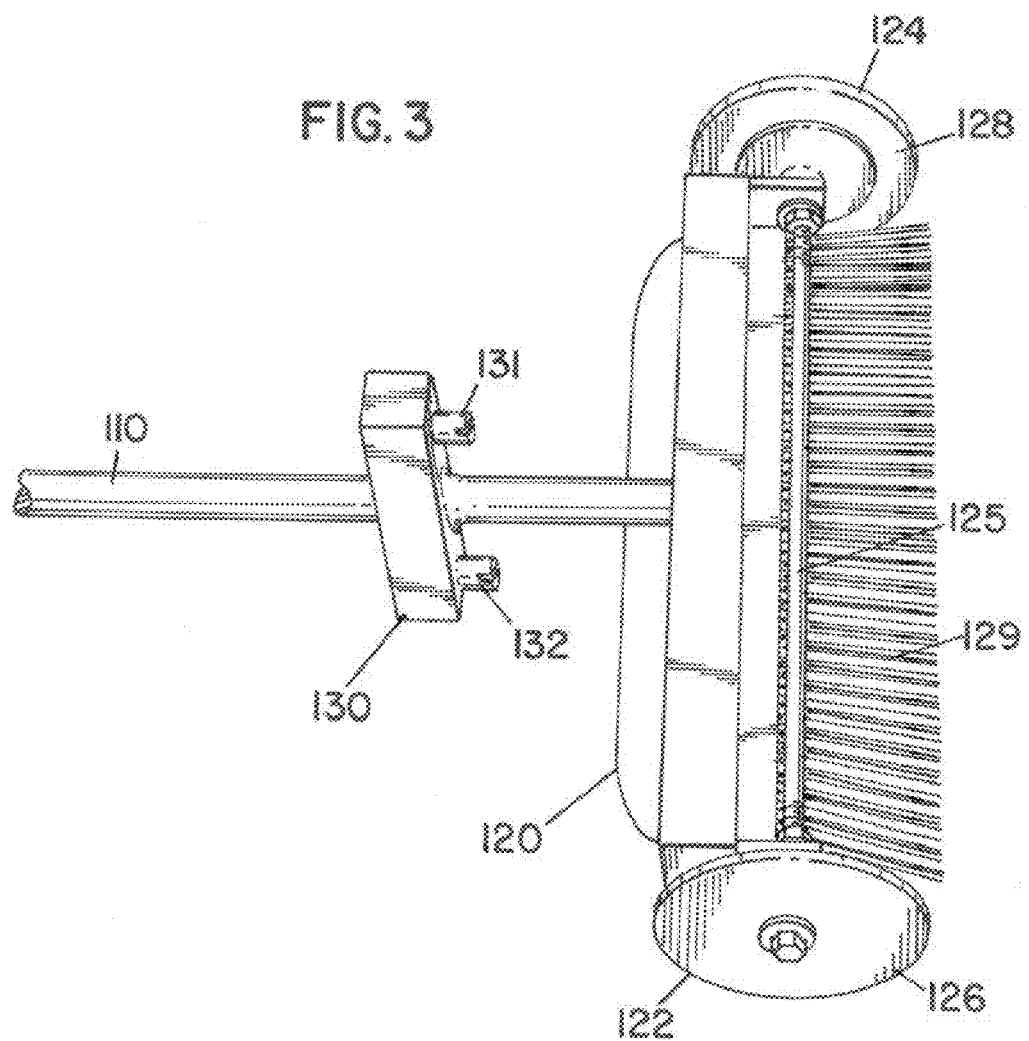
FIG. 3 is a perspective top view of the apparatus of FIG. 2.
Figure 4:
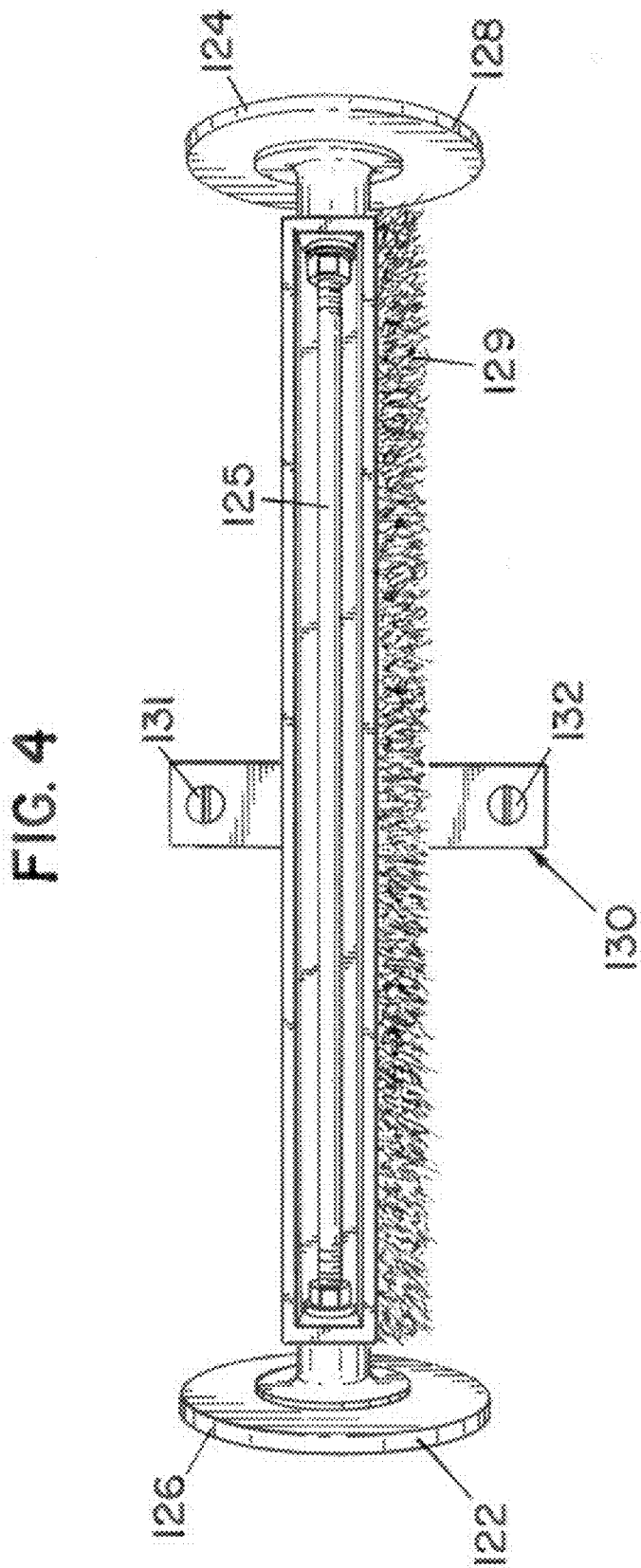
FIG. 4 is a perspective end view of the apparatus of FIG. 2.

A preferred method of this invention includes agitating the landscaping material during the treatment step in order to expose and thus treat more sides of the material. Applicator 100 preferably includes a mechanism to turn, flip or otherwise agitate landscaping material 15 during the treatment process; the mechanism may penetrate into landscape material 15 to facilitate the turning or agitation of the material. Applicator 100 also includes at least two treatment liquid outlets to apply the treatment liquid to landscape material 15 both before and after it has been agitated. Referring to FIGS. 2 through 4, a preferred embodiment of applicator 100 is illustrated.

As best seen in FIG. 2, applicator 100 has a wand body 110 extending from a first or distal end 111 to a second or proximal end 112. In use, applicator 100 is oriented so that distal end 111 is close to landscape material 15 and proximal end 112 is held by the user. Distal end 111 includes an agitation system 120 and an application system 130. Agitation system 120 provides support for applicator 100 and agitates the landscape material during use of application 100, and application system 130 provides the treatment liquid to the landscape material.

Agitation system 120 has a first side edge 122 and a second side edge 124 and an axel 125 extended from edge 122 to edge 124. Present at side edge 122 and mounted on axel 125 is a first wheel 126 and present at side edge 124 and mounted on axel 125 is a second wheel 128, to facilitate movement of applicator 100 over landscaping material. Wheels 126, 128 support applicator 100 as it is being moved across the landscape material being treated. Thinner wheels 126, 128 are preferred over thicker or wider wheels, to reduce the amount of landscape material that might be packed-down by wheel 126, 128. Wheels 126, 128 having a texture (e.g., knobby or studded wheels) provide less surface area for contacting the landscape material and also may agitate the material as they pass over the landscape material. Additionally, having wheels 126, 128 loosely connected to axel 125 further reduces the packing of landscape material.

Extending between wheels 126, 128 is an agitator mechanism, in this embodiment, a plurality of bristles 129, for extending into the landscape material and agitating the material as applicator 100 passes thereover. Bristles 129 may be wire bristles, natural bristles, nylon bristles, or the like. Tines may be used in lieu of bristles. Bristles 129 may be flexible and fixedly attached to agitation system 120 or may pivotally or otherwise move in relation to axel 125, either in a lateral (side-to-side motion) or radially in relation to axel 125. Bristles 129 may be aligned with axel 125 or may be offset from axel 125 (e.g., see FIG. 4, which illustrates bristles 129 behind axel 125). Bristles 129 may be closely packed or loosely packed, but are sufficiently flexible to engage with particulate or chips of landscape material.

Bristles 129 or other mechanisms used for agitation (e.g., tines) should extend past the outer circumference of wheels 126, 128; this allows bristles 129 to penetrate into the landscaping material. In many embodiments, an extension of about ⅛ inch or about ½ inch is sufficient, although longer or shorter bristles 129 could be used, depending on the landscape material being treated. For example, an extension of about ⅜ inch to ¼ inch is suitable for certain landscape materials, whereas an extension of about ¼ inch to ½ inch is better suited for other landscape materials. An extension of about ½ inch will agitate shredded wood mulch about 1 to 1½ inches deep.

Positioned toward proximate end 112 from agitation system 120 is application system 130, which provides treatment liquid (e.g., colorant) to the landscape material. Application system 130 has a first nozzle 131 and a second nozzle 132 positioned spaced from each other in a direction orthogonal to the direction of use of applicator 100. In this embodiment of applicator 100, nozzles 131, 132 are positioned on opposite sides of agitation system 120; see FIG. 4, which shows nozzle 131 on a first side of axel 125 and bristles 129 and nozzle 132 on the opposite side of axel 125 and bristles 129. Nozzle 131 is on the leading side of bristles 129 and nozzle 132 is on the trailing side of bristles 129. Nozzles 131, 132 may be equally distanced from and/or oriented in respect to agitation system 120. For example, either or both nozzles 131, 132 may be directed to spray parallel to bristles 129 or at an angle (for example, 15-30 degrees) in respect to bristles 129. A suitable distance between nozzles 131, 132, for example, is about 2 to 3 inches (e.g., about 2¾ inches).

Nozzles 131, 132 are so positioned so that in use, the landscape material is treated via nozzle 131, the material is flipped or agitated by bristles 129, and then the material is again treated via nozzle 132. Nozzles 131, 132 are selected to provide the desired spray and/or drop size for the landscape material being treated, the treatment liquid being used, and the environmental conditions (for example, for outside treatment on a windy day, larger drops would be desired, to lessen the amount of carried spray). Typical nozzle sizes include "fine spray", "medium drop", etc. Nozzles 131, 132 may have an adjustable spray pattern or may be adjustable in relation to axel 125 and bristles 129 so as to better direct the treatment liquid. Additional nozzles may be used, for example, positioned laterally across axel 125 for wider application paths. In some embodiments, a shroud or cover may be positioned near or around nozzles 131, 132 to direct the spray therefrom or to minimize overspray.

Nozzles 131, 132 are operably connected to a treatment liquid source (e.g., a colorant source) via wand 110. Returning to FIG. 2, proximal end 112 includes a trigger mechanism 134 to manipulate the flow of treatment liquid to nozzles 131, 132 through wand 110. Wand 110 may be hollow for passage of treatment liquid therethrough to nozzles 131, 132, or hoses may be positioned external to wand 110 to carry treatment liquid to nozzles 131, 132. Treatment liquid is provided to wand 110 by connector 135, such as a quick-connector or snap-fit connector.

It is understood that numerous variations of applicator 100 could be made while maintaining the overall inventive design of applicator 100 and remaining within the scope of the invention. Numerous alternate design or element features have been mentioned above. Other alternate designs include, for example, a modular device that can be easily disassembled for cleaning, or a more stable support system for the applicator (e.g., having three or four wheels).

Spray applicator 100 and variations thereof can be used for treating landscape material using the afore described methods. A particular example of coloring of wood mulch in a residential application using a method of this disclosure and applicator 100 of this disclosure follows.

A sprayer apparatus, such as applicator 100 of FIGS. 2 through 4, was used to apply colorant to installed mulch. The sprayer included two 3.25 inch diameter wheels, mounted to a sprayer wand (approximately 36 inches long) via an axel that extended across the sprayer. A plurality of nylon bristles, initially about 2-2.25 inches long, extended between the wheels and behind the axel. The overall width of the sprayer, including the wheels, was about 12 inches. The bristles extended past the outer circumference of the wheels. Over prolonged use of the sprayer applicator, the length of the bristles decreased, due to wear on the bristles. The sprayer applicator had a first spray nozzle and a second spray nozzle, both positioned about 14 inches above the axel of the sprayer. At the end of the wand opposite the bristles and the spray nozzles, was a trigger mechanism for activating the spraying of colorant.

The sprayer applicator was operably connected to a remote source of liquid colorant. The colorant was a water soluble pigment (obtained from Mix Manufacturing Inc. of St. Paul, Minn., under the trade designation "ABS" pigment, color "Buffalo") mixed with water. The water was provided at a rate of about 1.5 gallons/minute from a large storage tank, and the pigment, at a rate of about 7 pints/hour, was added thereto.

A rinse sprayer apparatus, such as sprayer 102 of FIG. 1, was used to apply rinse water (as both a pre-treatment and a post-treatment) to elements other than the mulch to be treated. The sprayer 102 was operably connected to the same large storage tank. Thus, the same liquid source (water) was used for the pre-treatment, the treatment, and the rinsing.

The mulch that was colored was a mixture of weathered mulch (at least one year old) and new mulch, made from reclaimed wood. The depth of the mulch covering was about 2 to 3 inches and was a combination of large pieces (about 1 to 3 inch pieces) and shredded fibrous pieces. The treatment of the mulch was done over a course of two sequential days. The new mulch was spread prior to treatment on the first day. When coloring began on the first day, the mulch was fairly dry.

First, various elements proximate the mulch were pre-treated with water. The pre-treated elements included trunks of deciduous trees, lower branches of evergreens, decorative rocks and boulders, plastic edging, and plants including Daylilies, Bleeding Hearts, and hostas. The pre-treatment water was applied by a handheld sprayer wand that was connected to the large water storage tank by a hose. The flow rate of water was about 4 gallons/minute. The water pre-treatment was applied at a pressure of about 50 psi. Within about 1 minute of pre-treating elements in an area, the mulch in that area was colored using the spray applicator.

To color the mulch, the sprayer applicator was rolled across the mulch, in about 1 to 2 foot long strokes, with a back-and-forth motion. The specific stroke depended on the length of the area to be covered, the placement of any obstacles, and also the position and orientation of the user's body. Each specific area of mulch was probably covered twice or three times. With each pass, after the first spray nozzle applied color to the mulch, the bristles of the sprayer turned the mulch to expose new mulch to be colored by the second spray nozzle. The color was dry in approximately one hour.

Within about 1 minute of coloring the mulch in a certain area, the previously pre-treated elements were rinsed with the same water spray as used for the pre-treating. Any other elements that may have been inadvertently colored, even if not pre-treated, were rinsed to remove any inadvertent color.

Approximately half of the mulch was colored the first day. On the second day, the mulch was damp, due to rain the night before. The general procedure was the same as on the drier mulch, except that each specific area of mulch was probably covered two to four times, in order to obtain a heavier coating of pigment on the mulch.

After drying, the mulch had a uniform, refreshed color that brightened the landscape.

In an alternative method, the sprayer applicator may be operably connected to a source of liquid colorant separate from the pre-treatment and/or rinse liquid (water). For example, 1 pint of water soluble pigment (e.g., from Mix Manufacturing Inc. of St. Paul, Minn., under the trade designation "ABS" pigment) can be missed with 4 gallons of water in a tank, such as in a back-pack type sprayer.

Thus, embodiments of the APPARATUS AND METHODS FOR TREATING MULCH IN SITU are disclosed. One skilled in the art will appreciate that the present invention can be practiced with embodiments other than those disclosed. The disclosed embodiments are presented for purposes of illustration and not limitation, and the present invention is limited only by the claims that follow.

What is claimed is:
1. A method for applying treatment to installed wood chips or wood mulch landscaping material in situ, comprising:
(a) providing installed wood chip or wood mulch landscaping material as a layer present over an area of ground;
(b) pre-treating areas not to be treated proximate the installed landscaping material;

(c) applying a treatment material onto the installed landscaping material; and
(d) rinsing the pre-treated areas after the treatment material is applied.

2. The method of claim 1, wherein applying a treatment material comprises spraying the treatment material.

3. The method of claim 2, wherein spraying the treatment material comprises spraying at 35-50 psi.

4. The method of claim 1, wherein applying a treatment material onto the landscaping material comprises spraying a colorant to the landscaping material.

5. The method of claim 4, wherein spraying a colorant comprises spraying an aqueous colorant comprising about 9-10 wt-% binder and about 50-70 wt-% pigment.

6. The method of claim 4, wherein spraying a colorant comprises spraying an aqueous colorant comprising about 9-9.5 wt-% binder and about 60-70 wt-% pigment.

7. The method of claim 1, wherein pre-treating areas not to be treated comprises spraying water on areas not to be treated.

8. The method of claim 7, wherein applying a treatment material is done before the water dries.

9. The method of claim 8, wherein rinsing is done before the treatment material dries.

10. The method of claim 1, wherein applying a treatment material comprises spraying the treatment material onto the landscaping material, agitating the sprayed landscaping material, and spraying the treatment material onto the agitated landscaping material.

11. The method of claim 10 wherein agitating the sprayed landscaping material comprises brushing the sprayed landscaping material.

\* \* \* \* \*